(12) United States Patent
Blok

(10) Patent No.: US 11,912,951 B2
(45) Date of Patent: Feb. 27, 2024

(54) POLYBUTENE-FREE LUBRICATING COMPOSITION

(71) Applicant: Borealis AG, Vienna (AT)

(72) Inventor: Achim Blok, Stenungsund (SE)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 17/778,896

(22) PCT Filed: Nov. 24, 2020

(86) PCT No.: PCT/EP2020/083211
§ 371 (c)(1),
(2) Date: May 23, 2022

(87) PCT Pub. No.: WO2021/105123
PCT Pub. Date: Jun. 3, 2021

(65) Prior Publication Data
US 2022/0396745 A1  Dec. 15, 2022

(30) Foreign Application Priority Data

Nov. 27, 2019 (EP) .................................... 19211787

(51) Int. Cl.
| | | |
|---|---|---|
| C10M 101/02 | (2006.01) | |
| C08F 2/01 | (2006.01) | |
| C08L 23/06 | (2006.01) | |
| C08L 23/08 | (2006.01) | |
| C10M 169/04 | (2006.01) | |
| C10N 30/00 | (2006.01) | |
| C10N 20/02 | (2006.01) | |
| C10N 30/02 | (2006.01) | |
| C10N 40/30 | (2006.01) | |

(52) U.S. Cl.
CPC ............ *C10M 101/02* (2013.01); *C08F 2/01* (2013.01); *C08L 23/06* (2013.01); *C08L 23/0853* (2013.01); *C10M 169/04* (2013.01); *C08L 2207/066* (2013.01); *C10M 2203/1025* (2013.01); *C10N 2020/02* (2013.01); *C10N 2030/02* (2013.01); *C10N 2030/40* (2020.05); *C10N 2040/30* (2013.01)

(58) Field of Classification Search
CPC ............ C10M 101/02; C10M 169/04; C10M 2203/1025; C08F 2/01; C08L 23/06; C08L 23/0853; C08L 2207/066; C10N 2020/02; C10N 2030/02; C10N 2030/40; C10N 2040/30
See application file for complete search history.

(56) References Cited

U.S. PATENT DOCUMENTS

| | | | |
|---|---|---|---|
| 4,798,684 A | 1/1989 | Salomon | |
| 5,084,197 A | 1/1992 | Galic et al. | |
| 5,578,557 A * | 11/1996 | Dougan | C10M 101/02 508/269 |
| 7,632,900 B1 * | 12/2009 | Imfeld | C08F 10/02 508/502 |
| 8,227,391 B2 * | 7/2012 | Ryan | C10M 141/06 508/279 |
| 2002/0127161 A1* | 9/2002 | Sgarbi | C10M 169/04 422/198 |
| 2010/0099589 A1* | 4/2010 | Ryan | C10M 141/06 508/279 |
| 2014/0357825 A1* | 12/2014 | Volker | F04D 29/06 508/591 |
| 2015/0197706 A1 | 7/2015 | Paquette et al. | |
| 2017/0260474 A1* | 9/2017 | Gutermuth | C08F 2/00 |
| 2018/0155457 A1* | 6/2018 | Berbee | B01J 12/00 |
| 2018/0290120 A1* | 10/2018 | Lammens | B01J 19/2415 |
| 2019/0040335 A1* | 2/2019 | Di Maio | C10M 169/02 |
| 2019/0244682 A1* | 8/2019 | De Ceuster | G16C 20/10 |

FOREIGN PATENT DOCUMENTS

| | | |
|---|---|---|
| CN | 102307975 A | 1/2012 |
| CN | 102597020 A | 7/2012 |
| CN | 108384619 A | 8/2018 |
| GB | 2128198 B | 4/1984 |
| JP | 49-34903 A | 3/1974 |
| JP | 63-6094 A | 1/1988 |
| JP | 4-31497 A | 2/1992 |
| JP | 2003213283 A | 7/2003 |
| WO | 2019028310 A1 | 2/2019 |

OTHER PUBLICATIONS

International Search Report for Chinese Patent Application No. 202080081144.8 dated Oct. 18, 2022, 14 pages.
Liu et al, "Lubricating of LDPE Hyper-Compressors", China Academic Journal Electronie Publishing House, vol. 33, No. 3 Jun. 2018, 4 pages.
Klamann et al., "Lubricants and Related Products", Synthesis, Properties, Application, International Standards, Verlag Chemie, Deerfield Beach, FL; ISBN 0 89573 177 0, 1984, 500 pages.
Notification of Transmittal of the International Search Report and the Written Opinion of the International Searching Authority for PCT/EP2020/083211, dated Jan. 26, 2021, 11 pages.
European Search Report for EP19211787 dated May 5, 2020, 8 pages.

(Continued)

*Primary Examiner* — Ellen M Mcavoy
(74) *Attorney, Agent, or Firm* — Lowenstein Sandler LLP

(57) ABSTRACT

The present invention relates to a polybutene-free lubricating composition, a method for lubricating a compressor using said lubricating composition and a method for pressurizing olefin in a compressor lubricated with said lubricating composition, the use of said lubricating composition for lubricating a compressor, a method of pressurizing olefin in a compressor lubricated with said lubricating composition and a method of preparing a high pressure polyolefin using a high pressure compressor lubricated with said lubricating composition.

12 Claims, No Drawings

(56) References Cited

OTHER PUBLICATIONS

Renkert et al, "Renoil TM High Viscosity White Mineral Oils", Jan. 29, 2018, 2 pages.
Ranney, Dr. M. W., "Lubricant Additives", Noyes Data Corporation, Second Edition, 1973, 353 pages.
Rudnick, "Lubricant Additives: Chemistry and Applications", CRC Press, 2009, 796 pages.
Mortier, "Chemistry and Technology of Lubricants", 3rd Edition, Springer Dordrecht Heidelberg, 2010, 561 pages.
Unicorn Petroleum Ind. "Technical Grade (LX) White Mineral Oils", Apr. 2019, 4 pages.

* cited by examiner

POLYBUTENE-FREE LUBRICATING COMPOSITION

CROSS-REFERENCE TO RELATED APPLICATION(S)

The present application is a national stage entry under 35 U.S.C. § 371 of International Application No. PCT/EP2020/083211, filed on Nov. 24, 2020, which claims priority to European Patent Application No. 19211787.7, filed on Nov. 27, 2019. The contents of these applications are hereby incorporated by reference in their entirety.

FIELD OF THE INVENTION

The present invention relates to a polybutene-free lubricating composition, a method for lubricating a compressor using said lubricating composition and a method for pressurizing olefin in a compressor lubricated with said lubricating composition, the use of said lubricating composition for lubricating a compressor, a method of pressurizing olefin in a compressor lubricated with said lubricating composition and a method of preparing a high pressure polyolefin using a high pressure compressor lubricated with said lubricating composition.

TECHNICAL BACKGROUND

High pressure polyolefins, such as high pressure low density polyethylene (LDPE) or ethylene vinyl acetate copolymer (EVA), are polymerized in a high pressure free-radical initiated polymerization process, in which the olefin monomers are pressurized to the operating pressure utilizing one or more compressor(s) such as e.g. a two-step compressor arrangement of a primary compressor followed by a high pressure compressor, such as a hyper compressor. In the primary compressor the olefin monomers are pressurized to a pressure of up to about 35 MPa and are then further pressurized in the following hyper compressor to the operating pressure of usually about 100 MPa to 310 MPa depending on whether an autoclave or tubular polymerization reactor is used.

Hyper compressors usually are cylinder compressors, which are capable reaching operating pressures of from about 70 MPa to 350 MPa. High pressure compressors, such as hyper compressors, require the use of lubricants in order to reduce friction between the moving parts. However, because of the high operating pressures and the unique architecture of high pressure compressors, the cylinders of these compressors require a lubricant with specific lubricity characteristics under the high injection pressure present. Lubricants employed in hyper compressors leaks downstream into the polymerization reactor. As such, the lubricants mix with and become part of the reaction mixture, which can interfere with the polymerization of the olefin monomers into high pressure polyolefin or affect the polyolefin properties.

As a result, mineral oil (white oil or paraffin oil) has been used as a lubricant in high pressure compressors because for most applications the leakage of mineral oil based lubricants into the reaction mixture has little, if any, adverse effect on high pressure polyolefin polymerization or the use of the polyolefin in the manufacturing of goods. Furthermore, high pressure compressor lubricants, such as hyper compressor lubricants, often require a food-grade lubricant. Current food grade white oil hyper compressor lubricants usually utilize a thickener to increase the viscosity of the lubricating composition to the required viscosity. WO 2019/028310 A1 discloses a lubricating composition comprising white oil with a kinematic viscosity of at least one of 80 $mm^2$/sec to 120 $mm^2$/sec at 40° C., 9.5 $mm^2$/sec to 14 mm/sec at 100° C. or a combination thereof and up to 40 wt % of a polymeric thickener such as polybutene. The problem of white oil based lubricating compositions comprising polybutene polymeric thickeners is that under operation conditions the white oil dissolves much easier and faster than the polybutene. As a consequence, the lubricant turns into a sticky fluid of very high viscosity. Especially the valves of the hyper compressor are affected by this sticky fluid which can cause sluggish valve operation, reduced valve efficiency (less compressor capacity) and even failures of the valve cones (poppets). Additionally, for specific applications, especially high purity applications, such as wire and cable applications, in which a high purity of the high pressure polyolefin is necessary in order to avoid e.g. electrical breakdown of high voltage cables, presence of heterogeneous material such as polymeric thickener in the process gas should be limited.

Thus, there is a need for new lubricating compositions for high pressure compressors, such as hyper compressors, which are based on mineral oil in order to reduce the effects on the polymerization mixture and the resulting polyolefin and are categorized as food-grade lubricants. These new lubricating composition should be free of polybutene in order to avoid polybutene leakage into the polymerization reactor. Additionally, viscosity changes of the lubricating compositions during operation should be reduced for avoiding negative effects on the valves and other parts of the high pressure compressor.

These objects are surprisingly achieved by a lubricating composition comprising white oil with a rather high kinematic viscosity and is free of polybutene.

SUMMARY OF THE INVENTION

The present invention relates to a lubricating composition comprising a white oil with a kinematic viscosity of at least one of:

130 $mm^2$/sec to 300 $mm^2$/sec at 40° C.;
15 $mm^2$/sec to 30 $mm^2$/sec at 100° C.; or
a combination thereof;
wherein the lubricating composition is characterized by being free of polybutene.

Further, the present invention relates to a method of lubricating a compressor comprising the step of applying the lubricating composition as defined above or below to one or more friction interfaces of the compressor.

Still further, the present invention relates to the use of the lubricating composition as defined above or below for lubricating one or more friction interfaces of a compressor.

Additionally, the present invention relates to a method of pressurizing olefin comprising the steps of:

Lubricating one or more friction interfaces of at least one high pressure compressor with the lubricating composition as defined above or below;
Introducing the olefin into said at least one lubricated compressor; and
Pressurizing the olefin with said at least one lubricated compressor,
wherein the at least one compressor is at least one of a high-pressure compressor, a hyper compressor or both.

Finally, the present invention relates to a method of preparing a high pressure polyolefin comprising the steps of:

Lubricating one or more friction interfaces of a high pressure compressor with the lubricating composition as defined above or below;

Pressurizing olefin with said lubricated high pressure compressor; and

Reacting the pressurized olefin to form the high pressure polyolefin.

DEFINITIONS

The term "white oil", as used herein, refers to a purified mixture of liquid saturated hydrocarbons, which are manufactured from petroleum through several refining purification stages, including catalytic hydrogenation. The white oils used herein may be food-grade or medicinal white oil and meets at least one of the following requirements: United States Federal Drug Administration 21 C.F.R. § 178.3620 (a), United States Pharmacopeia, National Sanitation Foundation HI Registration, European Pharmacopeia, European Regulation (EU) October 2011, or a combination thereof.

The term "high pressure compressor", as used herein, refers to a compressor that is capable of compressing a raw material, such as an olefin (e.g. ethylene), to a pressure of at least 20 MPa, 25 MPa, 30 MPa, or 35 MPa.

The term "hyper compressor", as used herein, refers to a compressor that is capable of compressing a raw material, such as an olefin (e.g. ethylene), to a pressure of at least 50 MPa, 55 MPa, 60 MPa, 65 MPa, 70 MPa, 75 MPa, 80 MPa, 85 MPa, 90 MPa, 95 MPa, or 100 MPa.

The high pressure or hyper compressor may be a horizontal balanced opposed reciprocating compressor. For example, the compressor may be a positive displacement, reciprocating crosshead, multi-stage compressor. The compressor may comprise at least one packed-plunger type cylinder, which may be made of solid tungsten-carbide or a tungsten-carbide coated steel.

"Friction interfaces" of a high pressure compressor in the sense of the present invention are interfaces in the high pressure compressor which cause friction such as the interface between a moving part and a stationary part or between two moving parts. Friction interfaces can be selected e.g. from piston rings, valves, cylinder walls, rod pressure packings, gas sealing elements, pressure breaker rings, plunger guide bushes or the like.

The term "polymeric thickener", as used herein, refers to a polymeric component with a high kinematic viscosity which is added to a lower viscosity base oil for increasing the kinematic viscosity of lubricating compositions and includes at least one of polybutene polymeric thickeners, high molecular weight hydrocarbons, polyesters, polymers of methacrylate, copolymers of methacrylate, butadiene, olefins, alkylated styrenes, or combinations thereof.

Polybutene polymeric thickeners, or polybutene, used in lubricants are mainly composed of isobutene and often referred to as polyisobutenes, or "PIBs". [ . . . ] Polybutenes are produced by polymerization of a hydrocarbon stream containing isobutene, other butene olefins (butene-1 and butene-2) and butanes. The main sources of the $C_4$ feedstock are naphtha steam and refinery catalytic cracker operations (see Mortier, Fox, Orszulik, Chemistry and Technology of Lubricants, Springer, $3^{rd}$ edition (2014), p. 46-47.

DETAILED DESCRIPTION OF THE INVENTION

The present invention relates to a lubricating composition comprising a white oil with a kinematic viscosity of at least one of:

130 $mm^2$/sec to 300 $mm^2$/sec at 40° C.;

15 $mm^2$/sec to 30 $mm^2$/sec at 100° C.; or a combination thereof;

wherein the lubricating composition is characterized by being free of polybutene.

The white oil is preferably a paraffinic white oil.

It is further preferred that the white oil is food-grade white oil.

It is additionally preferred that the white oil is medicinal white oil.

The white oil preferably has a kinematic viscosity of 130 $mm^2$/sec to 300 $mm^2$/sec, more preferably of 150 $mm^2$/sec to 280 $mm^2$/sec, still more preferably of 170 $mm^2$/sec to 260 $mm^2$/sec and most preferably of 190 $mm^2$/sec to 240 $mm^2$/sec at a temperature of 40° C.

Further, the white oil preferably has a kinematic viscosity of 15 $mm^2$/sec to 30 $mm^2$/sec, more preferably of 16 $mm^2$/sec to 28 $mm^2$/sec, still more preferably of 17 $mm^2$/sec to 25 $mm^2$/sec and most preferably of 19 $mm^2$/sec to 22 $mm^2$/sec at a temperature of 100° C.

It is especially preferred that the white oil meets the kinematic viscosity ranges as disclosed above at both temperatures of 40° C. and 100° C.

The lubricating composition preferably comprises the white oil in an amount of from 85.0 wt % to 99.9 wt %, more preferably in an amount of from 90.0 wt % to 99.8 wt %, still more preferably in an amount of from 92.5 wt % to 99.5 wt % and most preferably in an amount of from 95.0 wt % to 99.0 wt %, based on the total weight of the lubricating composition.

The lubricating composition can further comprise performance additives, which are preferably selected from dispersants, detergents, corrosion inhibitors, rust inhibitors, metal deactivators, anti-wear agents, extreme pressure additives, anti-seizure agents, wax modifiers, viscosity index improvers, pour point depressants, viscosity modifiers, fluid-loss additives, seal compatibility agents, friction modifiers lubricity agents, anti-staining agents, chromophoric agents, demulsifiers, emulsifiers, densifiers, wetting agents, gelling agents, tackiness agents, colorants, antioxidants, oxidation inhibitors or a combination thereof. For a review of many commonly used additives, see Klamann in Lubricants and Related Products, Verlag Chemie, Deerfield Beach, FL; ISBN 0 89573 177 0. Reference is also made to "Lubricant Additives" by M. W. Ranney, published by Noyes Data Corporation of Parkridge, NJ (1973) and "Lubricant Additives: Chemistry and Applications" edited by L. R. Rudnick, published by CRC Press of Boca Raton, FL (2009).

The lubricating composition preferably comprises the performance additives in an amount of from 0.1 wt % to 15.0 wt %, more preferably in an amount of from 0.2 wt % to 10.0 wt %, still more preferably in an amount of from 0.5 wt % to 7.5 wt % and most preferably in an amount of from 1.0 wt % to 5.0 wt %, based on the total weight of the lubricating composition.

The lubricating composition preferably has a weight ratio of white oil to performance additives of from 85.0:15.0 to 99.9:0.1, more preferably of from 90.0:10.0 to 99.8:0.2, still more preferably of from 92.5:7.5 to 99.5 to 0.5 and most preferably of from 95.0:5.0 to 99.0:1.0.

The viscosity improver, viscosity modifier, or Viscosity Index (VI) modifier increases the viscosity of the lubricating composition at elevated temperatures, thereby increasing film thickness, and having limited effects on the viscosity of the lubricating composition at low temperatures. In certain embodiments, the lubricating composition comprises one or more viscosity improver, such as 1, 2, 3, 4, 5, 6, or more viscosity improver(s). Any viscosity improver that is known or that becomes known in the art may be utilized in the lubricating composition of the present disclosure. Exemplary viscosity improvers include high molecular weight hydrocarbons, polyesters and viscosity index improver dispersants that function as both a viscosity index improver and a dispersant. The molecular weight of these polymers can range from about 1,000 to about 1,500,000 (e.g., about 20,000 to about 1,200,000 or about 50,000 to about 1,000,000). In a particular embodiment, the molecular weights of these polymers can range from about 1,000 to about 1,000,000 (e.g., about 1,200 to about 500,000 or about 1,200 to about 5,000).

The viscosity improver(s) can be present in the lubricating composition in an amount of up to 15 wt %, preferably up to 12 wt % still more preferably up to 10 wt % and most preferably up to 7 wt %, based on the total weight of the lubricating composition.

It is, however, preferred that the lubricating composition of the present invention does not include viscosity improvers. In any case, the lubricating composition of the present invention does not include polybutene.

In certain embodiments, the lubricating composition comprises at least one antioxidant (e.g., 1, 2, 3, 4, 5, 6, or more antioxidant(s)). The antioxidant(s) may be added to retard the oxidative degradation of base oils during service. Such degradation may result in deposits on metal surfaces, the presence of sludge, or a viscosity increase in the lubricant. One skilled in the art knows a wide variety of oxidation inhibitors that are useful in lubricating oil compositions. See, Klamann in Lubricants and Related Products, op cite, and U.S. Pat. Nos. 4,798,684 and 5,084,197, for example. Any antioxidant that is known or that becomes known in the art may be utilized in the lubricating composition of the present invention.

Two general types of antioxidants are those that react with the initiators, peroxy radicals, and hydroperoxides to form inactive compounds, and those that decompose these materials to form less active compounds. Examples are hindered (alkylated) phenols and aromatic amines. These oxidation inhibitors are used in turbine, circulation, and hydraulic oils that are intended for extended service.

Suitable antioxidants are described in WO 2019/028310 A1.

Antioxidants are usually present in the lubricating composition in an amount of from 0.001 to 1.0 wt %, preferably 0.005 to 0.5 wt % still more preferably up to 0.01 to 0.2 wt % and most preferably 0.03 to 0.15 wt %, based on the total weight of the lubricating composition.

In certain embodiments, the antioxidants can be present in the lubricating composition in an amount of up to 7 wt % such as up to 5 wt %. In these embodiments the antioxidants are added in such high amounts as scavenging agents for scavenging the radicals inside the packing of the compressor to avoid polymerization.

The lubricating composition can comprise at least one pour point depressant or a lube oil flow improver. Pour point depressant may be added to lower the minimum temperature at which the fluid will flow or can be poured. Any pour point depressant or lube oil flow improved that is known or that becomes known in the art may be utilized in the lubricating composition of the present disclosure. Suitable pour point depressants are described in WO 2019/028310 A1.

Pour point depressants are usually present in the lubricating composition in an amount of from 0.01 to 2.0 wt %, preferably 0.02 to 1.5 wt % still more preferably up to 0.03 to 1.0 wt % and most preferably 0.05 to 0.8 wt %, based on the total weight of the lubricating composition.

The lubricating composition can comprise at least one (e.g., 1, 2, 3, 4, or more) antifoam agent. The antifoam agent(s) may be added to retard the formation of stable foams. Suitable antifoam agents are described in WO 2019/028310 A1. Although their presence is not required to obtain the benefit of the present invention, the antifoam agent or agents may be present in a combined amount less than 1 wt %, preferably less than 0.1 wt % of the lubricating composition.

The lubricating composition can comprise at least one (e.g. 1, 2, 3, 4, or more) corrosion inhibitor or anti-rust additive. The corrosion inhibitor or anti-rust additive may be added to protect lubricated metal surfaces against chemical attack by water or other contaminants. A wide variety of corrosion inhibitors are commercially available, and any corrosion inhibitor or anti-rust additive that is known or that becomes know may be utilized in the lubricating composition of the present invention. Suitable corrosion inhibitors or anti-rust additives are described in WO 2019/028310 A1. Antirust additives are usually present in the lubricating composition in an amount of from 0.1 to 2.0 wt %, preferably 0.2 to 1.5 wt % still more preferably up to 0.3 to 1.0 wt % and most preferably 0.3 to 0.8 wt %, based on the total weight of the lubricating composition.

The lubricating composition can comprise at least one (e.g. 1, 2, 3, 4, or more) metal passivator(s), deactivator s) and corrosion inhibitor(s). Suitable metal passivator(s), deactivator s) and corrosion inhibitor(s) are described in WO 2019/028310 A1. Although their presence is not required to obtain the benefit of the present disclosure, the metal deactivator(s) and corrosion inhibitor(s) may be present from 0 to 1 wt %, preferably from 0.01 to 0.5 wt % of the total lubricating composition.

The lubricating composition can comprise at least one antiwear additive or wear inhibitor. Any antiwear additive that is known or that becomes known may be utilized in the lubricating composition of the present disclosure. In certain embodiments, the wear inhibitor is at least one of a food-grade sulfur containing compound, a food-grade phosphorus containing compound, or a combination thereof. The antiwear additive may be an alkyldithiophosphate(s), aryl phosphate(s) and/or phosphite(s). The antiwear additive(s) may be essentially free of metals, or they may contain metal salts. Suitable antiwear additives or wear inhibitors are described in WO 2019/028310 A1.

The antiwear additive may be present in the lubricating composition in amounts of from 0 to about 3 wt %, preferably from 0.05 wt % to 2 wt %, more preferably from 0.1 wt % to 1.5 wt % and most preferably from 0.1 wt % to 1 wt %, based on the total weight of the lubricating composition, although more or less can often be used advantageously.

The lubricating composition can comprise at least one extreme pressure agent. Any extreme pressure agent that is known or that becomes know may be utilized in the lubricating composition of the present disclosure. In certain embodiments, the extreme pressure agent includes at least two (e.g., 2, 3, 4, or more) extreme pressure agents. Suitable extreme pressure agents are described in WO 2019/028310 A1. Extreme pressure additives can be used individually or in the form of mixtures, in an amount within the range from 0 to about 2 wt % of the lubricating composition.

The lubricating composition can comprise at least one dispersant. During machine operation, oil-insoluble oxidation byproducts are produced. The dispersant may be added to help keep these byproducts in solution, thus diminishing their deposition on metal surfaces. Any dispersant that is known or that becomes know may be utilized in the lubricating composition of the present disclosure. In certain embodiments, the dispersant includes at least two (e.g., 2, 3, 4, or more) dispersants.

In some embodiments, the dispersants is ashless or ash-forming in nature. In an embodiment, the dispersant is an ashless. So called ashless are organic materials that form substantially no ash upon combustion. For example, non-metal-containing or borated metal-free dispersants are considered ashless. In contrast, metal-containing detergents form ash upon combustion. Suitable dispersants are described in WO 2019/028310 A1.

Dispersants may be used in an amount of 0 to 10 wt %, preferably 0.01 to 8 wt %, more preferably 0.1 to 5 wt %, most preferably 0.5 to 3 wt %. On an active ingredient basis, such additives may be used in an amount of 0 to 10 wt %, preferably 0.3 to 3 wt %. As used herein, the dispersant concentrations are given on an "as delivered" basis. The active dispersant may be delivered with a process oil. The "as delivered" dispersant may contain from 20 wt % to 80 wt %, preferably from 40 wt % to 60 wt %, of active dispersant in the "as delivered" dispersant product.

The lubricating composition can comprise at least one detergent. The detergent may be added to protect lubricated metal surfaces against chemical attack by water or other contaminants. Any detergent that is known or that becomes know may be utilized in the lubricating composition of the present disclosure. In certain embodiments, the detergent includes at least two (e.g., 2, 3, 4, or more) detergents. Suitable detergents are described in WO 2019/028310 A1.

Detergents can be present in the lubricating composition in an amount of from 0 to 6.0 wt %, preferably 0 to 5.0 wt %, more preferably from 0.01 wt % to 3.0 wt %, based on the total weight of the lubricating composition.

As used herein, the detergent concentrations are given on an "as delivered" basis. The active detergent may delivered with a process oil. The "as delivered" detergent can contain from 20 wt % to 100 wt %, preferably from 40 wt % to 60 wt %, of active detergent in the "as delivered" detergent product.

The lubricating composition can comprise at least one (e.g., 1, 2, 3, 4, or more) friction modifier. A friction modifier is any material or materials that can alter the coefficient of friction of a surface lubricated by any lubricant or fluid containing such material(s). Friction modifiers, also known as friction reducers, or lubricity agents or oiliness agents, and other such agents that change the ability of base oils, formulated lubricant compositions, or functional fluids, to modify the coefficient of friction of a lubricated surface may be effectively used in combination with the base oils or lubricant compositions of the present disclosure if desired. Friction modifiers that lower the coefficient of friction are particularly advantageous in combination with the base oils and lube compositions of this disclosure. Any friction modifier that is known or that becomes know may be utilized in the lubricating composition of the present disclosure. Suitable friction modifiers are described in WO 2019/028310 A1. Friction modifiers may be present in the lubricating composition in an amount from 0 to 3.5 wt %, preferably 0.01 wt % to 1.5 wt % of the lubricating composition. These ranges may apply to the amounts of individual friction modifier present in the composition or to the total friction modifier component in the compositions, which may include a mixture of two or more friction modifiers.

Many friction modifiers tend to also act as emulsifiers. This is often due to the fact that friction modifiers often have non-polar fatty tails and polar head groups.

The lubricating composition of the present disclosure exhibit desired properties, e.g., wear control, in the presence or absence of a friction modifier.

The friction modifier or friction modifiers may be present in the lubricating composition in an amount of 0.01 wt % to 5 wt %, preferably 0.1 wt % to 2.5 wt %, more preferably 0.1 wt % to 1.5 wt %, most preferably 0.1 wt % to 1 wt %. Concentrations of molybdenum-containing materials are often described in terms of Mo metal concentration. Advantageous concentrations of Mo may range from 25 ppm to 700 ppm, more preferably 50 to 200 ppm. Friction modifiers of all types may be used alone or in mixtures with the materials of this disclosure. Often mixtures of two or more friction modifiers, or mixtures of friction modifier(s) with alternate surface active material(s), are also desirable.

When lubricating compositions contain one or more of the additives discussed above, the additive(s) are blended into the composition in an amount sufficient for it to perform its intended function. Exemplary amounts of such additives useful in the present disclosure are shown in Table 1 below.

It is noted that many of the additives are shipped from the additive manufacturer as a concentrate, containing one or more additives together, with a certain amount of base oil diluents. Accordingly, the weight amounts in Table 1 below, as well as other amounts mentioned herein, are directed to the amount of active ingredient (that is the non-diluent portion of the ingredient). The weight percent (wt %) indicated below is based on the total weight of the lubricating oil composition.

TABLE 1

Exemplary Amounts of Industrial Lubricating Oil Components

| Compound | Useful [wt %] | Preferred [wt %] | Especially preferred [wt %] |
|---|---|---|---|
| Dispersant | 0-20 | 0-3 | 0-1.0 |
| Detergent | 0-20 | 0-3 | 0-1.0 |
| Friction Modifier | 0-5 | 0-1.5 | 0.01-1.0 |
| Antioxidant | 0.01-5 | 0.01-3 | 0.01-1.0 |
| Pour Point Depressant | 0-5 | 0.-1.5 | 0-1.0 |
| Antifoam Agent | 0-3 | 0-0.3 | 0-0.3 |
| Demulsifier | 0-3 | 0-0.15 | 0-0.15 |
| Viscosity Modifier | 0-2 | 0-1 | 0-1.0 |
| Antiwear | 0-3 | 0-1.5 | 0-1.0 |
| Inhibitor and Antirust | 0.01-5 | 0.01-2 | 0.01-1.0 |

The foregoing additives are all commercially available materials. These additives may be added independently but are usually precombined in packages which can be obtained from suppliers of lubricant oil additives. Additive packages with a variety of ingredients, proportions and characteristics are available and selection of the appropriate package will take the requisite use of the ultimate composition into account.

The lubricating composition according to the present invention is characterized by being free of polybutene.

It is preferred that lubricating composition according to the present invention is characterized by being free of any polymeric thickener or viscosity modifier as defined above.

This means that the lubricating composition according to the present invention preferably does not include any polymeric component which increases the viscosity of the lubricating composition.

It is preferred that the lubricating composition consists of the white oil and the performance additives as disclosed above or below.

The lubricating composition preferably has a kinematic viscosity of 180 mm$^2$/sec to 300 mm$^2$/sec, more preferably of 185 mm$^2$/sec to 280 mm$^2$/sec, still more preferably of 190 mm$^2$/sec to 260 mm$^2$/sec and most preferably of 195 mm$^2$/sec to 240 mm$^2$/sec at a temperature of 40° C.

The lubricating composition preferably has a kinematic viscosity of 18 mm$^2$/sec to 30 mm$^2$/sec, more preferably of 19 mm$^2$/sec to 28 mm$^2$/sec, still more preferably of 20 mm$^2$/sec to 25 mm$^2$/sec and most preferably of 21 mm$^2$/sec to 22 mm$^2$/sec at a temperature of 100° C.

It is especially preferred that the lubricating composition meets the kinematic viscosity ranges as disclosed above at both temperatures of 40° C. and 100° C.

Further, the lubricating composition preferably has a density @ 15° C. of from 820 to 900 kg/m$^3$, more preferably of from 835 to 895 kg/m$^3$ and most preferably of from 850 to 890 kg/m$^3$, determined according to ASTM D4052.

Still further, the lubricating composition preferably has a flash point of from 215 to 325° C., more preferably of from 235 to 310° C. and most preferably of from 250 to 290° C., determined according to ASTM D97.

Additionally, the lubricating composition preferably has a pour point of from −20 to 0° C., more preferably of from −17 to −3° C. and most preferably of from −14 to −5° C., determined according to ASTM D92.

Further, the lubricating composition preferably has a titration acid number of from 0.1 to 2.0 mg KOH/g, more preferably of from 0.2 to 1.5 mg KOH/g and most preferably of from 0.3 to 1.0 mg KOH/g, determined according to ASTM D664.

The lubricating composition according to the invention is preferably prepared by mixing the white oil as defined above or below and the performance additives as defined above or below in the weight amounts as disclosed herein.

In another aspect, the present invention relates to a method of lubricating a compressor comprising the step of applying the lubricating composition as defined above or below to one or more friction interfaces of the compressor.

The compressor can be a high pressure compressor or a hyper compressor.

In yet another aspect, the present invention relates to the use of the lubricating composition as defined above or below for lubricating one or more friction interfaces of a compressor.

The compressor can be a high pressure compressor or a hyper compressor.

In still another aspect, the present invention relates to a method of pressurizing olefin comprising the steps of:
  Lubricating one or more friction interfaces of at least one high pressure compressor with the lubricating composition as defined above or below;
  Introducing the olefin into said at least one lubricated compressor; and
  Pressurizing the olefin with said at least one lubricated compressor,
  wherein the at least one compressor is at least one of a high-pressure compressor, a hyper compressor or both.

The olefin is preferably selected from alpha olefins such as ethylene or C3 to C10 alpha olefins, and/or vinyl acetate or other olefin containing monomers which can be usually copolymerized together with ethylene to from high pressure low density polyethylene (LDPE) copolymers, especially preferred are ethylene and optionally olefin containing monomers which can be usually copolymerized together with ethylene to from high pressure low density polyethylene (LDPE) copolymers.

The olefin is preferably pressurized to an operating pressure of from 100 to 310 MPa.

The olefin can be pressurized in one compressor, which is preferably a hyper compressor, preferably to an operating pressure of from 100 to 310 MPa.

In another embodiment, the olefin can be pressurized in two compressors connected in series. The first compressor is preferably a high pressure compressor, in which the olefin is preferably pressurized to a first pressure of from 10 to 35 MPa. The second compressor is preferably a hyper compressor, in which the pre-pressurized olefin is preferably further pressurized to an operating pressure of from 100 to 310 MPa.

In a final aspect of the present invention, the present invention relates to a method of preparing a high pressure polyolefin comprising the steps of:
  Lubricating one or more friction interfaces of at least one high pressure compressor with the lubricating composition as defined above or below;
  Pressurizing olefin with said lubricated high pressure compressor; and
  Reacting the pressurized olefin to form the high pressure polyolefin.

In all above described aspects of the invention it is preferred that at least one of the one or more friction interfaces of the compressor which is lubricated with the lubricating composition according to the invention is one or more friction interfaces located at the front injection zone of the compressor. The one or more friction interfaces located at the front injection zone are especially relevant for carryover of the lubricating composition into the polymerization stream.

Other friction interfaces of the compressor which are not located at the front injection zone may be lubricated with a different lubricating composition, such as a lubricating composition comprising polybutene.

In another embodiment of all above described aspects all friction interfaces of the compressor are lubricated with the lubricating composition according to the present invention.

The olefin is preferably selected from alpha olefins such as ethylene or C3 to C10 alpha olefins, and/or vinyl acetate or other olefin containing monomers which can be usually copolymerized together with ethylene to from high pressure low density polyethylene (LDPE) copolymers, especially preferred are ethylene and optionally olefin containing monomers which can be usually copolymerized together with ethylene to from high pressure low density polyethylene (LDPE) copolymers.

The high pressure polyolefin is preferably selected from high pressure low density polyethylene (LDPE) homo- or copolymers and high pressure ethylene vinylacetate copolymers, most preferably from high pressure low density polyethylene (LDPE) homo- or copolymers.

The olefin is preferably pressurized to an operating pressure of from 100 to 310 MPa.

The olefin can be pressurized in one compressor, which is preferably a hyper compressor, preferably to an operating pressure of from 100 to 310 MPa.

In another embodiment, the olefin can be pressurized in two compressors connected in series. The first compressor is preferably a high pressure compressor, in which the olefin is preferably pressurized to a first pressure of from 10 to 35 MPa. The second compressor is preferably a hyper compressor, in which the pre-pressurized olefin is preferably further pressurized to an operating pressure of from 100 to 310 MPa.

BENEFITS OF THE INVENTION

The lubricating composition according to the invention as described above or below shows the following benefits compared to prior art lubricating compositions made from white oil, which contain polymeric thickeners such as polybutene:
- By means of the increased viscosity of the white oil used as main component in the lubricating composition of the present invention, a lower amount of white oil is leaked into the downstream polymerization reactor.
- Since the lubricating composition according to the invention does not contain a polymeric thickeners, which has a higher viscosity as the white oil, no selective leaking of the white oil into the polymerization reactor and enrichment of the polymeric thickener in the lubricating composition remaining in the compressor occurs.
- No polybutene is carried over into the product (the hyper compressor cylinders always leak ca 30% of the totally injected volume to the process gas)
- Absence of polybutene will support an improved fouling layer situation for hyper intercooler, preheater to reactor, reactor itself, aftercooler of reactor
- Since polybutene is a very sticky component (alike liquid chewing gum), the absence of polybutene brings advantage for the function of the bronze sealing elements of the hyper compressor cylinder packing and especially for the valves of the hyper compressors, especially in the case of multi-poppet design.
- For crosslinked high pressure low density polyethylene it has been demonstrated that the product properties for high voltage cable material are improved.

The invention claimed is:

1. A lubricating composition comprising a white oil, the white oil having a kinematic viscosity of:
190 mm$^2$/sec to 240 mm$^2$/sec at 40° C.; and
19 mm$^2$/sec to 22 mm$^2$/sec at 100° C.;
wherein the lubricating composition is characterized by being free of a polymeric thickener and being free of polybutene.

2. The lubricating composition according to claim 1, wherein the white oil is included in an amount of from 85.0 wt % to 99.9 wt %, based on the total weight of the lubricating composition.

3. The lubricating composition according to claim 1, further comprising performance additives selected from the group consisting of dispersants, detergents, corrosion inhibitors, rust inhibitors, metal deactivators, anti-wear agents, extreme pressure additives, anti-seizure agents, wax modifiers, viscosity index improvers, pour point depressants, viscosity modifiers, fluid-loss additives, seal compatibility agents, friction modifiers lubricity agents, anti-staining agents, chromophoric agents, demulsifiers, emulsifiers, densifiers, wetting agents, gelling agents, tackiness agents, colorants, antioxidants, oxidation inhibitors and combinations thereof, in an amount of from 0.1 wt % to 15.0 wt %, based on the total weight of the lubricating composition.

4. The lubricating composition according to claim 1, further comprising performance additives selected from the group consisting of dispersants, detergents, corrosion inhibitors, rust inhibitors, metal deactivators, anti-wear agents, extreme pressure additives, anti-seizure agents, wax modifiers, viscosity index improvers, pour point depressants, viscosity modifiers, fluid-loss additives, seal compatibility agents, friction modifiers lubricity agents, anti-staining agents, chromophoric agents, demulsifiers, emulsifiers, densifiers, wetting agents, gelling agents, tackiness agents, colorants, antioxidants, oxidation inhibitors and combinations thereof, and has a weight ratio of the white oil to the performance additives of from 85.0:15.0 to 99.9:0.1.

5. The lubricating composition according to claim 1, that is free of any polymeric thickener.

6. The lubricating composition according to claim 1, having a density at 15° C. of from 820 to 900 kg/m$^3$, determined according to ASTM D4052.

7. The lubricating composition according to claim 1, having a flash point of from 215 to 325° C., determined according to ASTM D97.

8. The lubricating composition according to claim 1, having a pour point of from −20 to 0° C., determined according to ASTM D92.

9. The lubricating composition according to claim 1, having a titration acid number of from 0.1 to 2.0 mg KOH/g, determined according to ASTM D664.

10. A method of lubricating a compressor comprising applying the lubricating composition according to claim 1 to one or more friction interfaces of the compressor.

11. A method of pressurizing olefin comprising:
Lubricating one or more friction interfaces of at least one high pressure compressor with the lubricating composition according to claim 1;
Introducing the olefin into said at least one lubricated compressor; and
Pressurizing the olefin with said at least one lubricated compressor,
wherein the at least one compressor is at least one of a high-pressure compressor, a hyper compressor or both.

12. A method of preparing a high pressure polyolefin comprising:
Lubricating one or more friction interfaces of a high pressure compressor with the lubricating composition according to claim 1;
Pressurizing olefin with said lubricated high pressure compressor; and
Reacting the pressurized olefin to form the high pressure polyolefin.

* * * * *